(12) United States Patent
Daugaard et al.

(10) Patent No.: US 8,992,736 B2
(45) Date of Patent: Mar. 31, 2015

(54) SELECTIVE TEMPERATURE QUENCH AND ELECTROSTATIC RECOVERY OF BIO-OIL FRACTIONS

(75) Inventors: Daren E. Daugaard, Skiatook, OK (US); Samuel T. Jones, Dewey, OK (US); Dustin L. Dalluge, Ames, IA (US); Robert C. Brown, Ames, IA (US)

(73) Assignees: Iowa State University Research Foundation, Inc., Ames, IA (US); Phillips 66 Company, Houston, TX (US)

( * ) Notice: Subject to any disclaimer, the term of this patent is extended or adjusted under 35 U.S.C. 154(b) by 900 days.

(21) Appl. No.: 13/114,846

(22) Filed: May 24, 2011

(65) Prior Publication Data

US 2011/0315537 A1 Dec. 29, 2011

Related U.S. Application Data

(60) Provisional application No. 61/358,351, filed on Jun. 24, 2010.

(51) Int. Cl.
| | | |
|---|---|---|
| C10B 53/02 | (2006.01) | |
| C10G 1/00 | (2006.01) | |
| C10C 5/00 | (2006.01) | |
| B01D 5/00 | (2006.01) | |
| B03C 3/014 | (2006.01) | |

(Continued)

(52) U.S. Cl.
CPC .......... C10C 5/00 (2013.01); B01D 5/0027 (2013.01); B01D 53/002 (2013.01);

(Continued)

(58) Field of Classification Search
CPC ...... B03C 3/014; B03C 3/017; B01D 5/0027; B01D 53/002; C10B 53/02; C10B 49/08; C10C 5/00; C10K 1/04; C10K 1/028; Y02E 50/14
USPC .............. 201/30; 95/66, 67, 73; 585/240, 242
See application file for complete search history.

(56) References Cited

U.S. PATENT DOCUMENTS 1,204,906 A * 11/1916 Schmidt et al. .................. 95/67
1,604,424 A * 10/1926 Schmidt ........................... 95/67

(Continued)

FOREIGN PATENT DOCUMENTS

WO    WO2011/041756    4/2011

OTHER PUBLICATIONS

International Search Report issued Aug. 22, 2011 for International Application PCT/US2011/037765.

(Continued)

*Primary Examiner* — Jill Warden
*Assistant Examiner* — Joye L Woodard
(74) *Attorney, Agent, or Firm* — Gardere Wynne Sewell LLP; Chris P. Perque; Teresa J. Lechner-Fish

(57) ABSTRACT

A process for quenching, separating and collecting targeted components of a hot pyrolysis product stream from the pyrolysis of biomass is provided. The process utilizes sequential steps of rapid quenching and electrostatic precipitation comprising injecting a coolant comprising at least one of nitrogen, a noble gas and mixtures thereof into a hot pyrolysis vapor to selectively condense a first fraction of components from the hot pyrolysis vapor at a first predetermined temperature which is then collected by electrostatic precipitation in a first electrostatic precipitator at about the first predetermined temperature, where a wall temperature of the first electrostatic precipitator is maintained slightly higher than the first predetermined temperature. The sequential steps of coolant injection and collection are repeated at progressively cooler temperatures in order to selectively collect one or more fractions of the hot mixture.

15 Claims, 5 Drawing Sheets

(51) Int. Cl.
  *B03C 3/017* (2006.01)
  *C10B 49/08* (2006.01)
  *C10K 1/04* (2006.01)
  *C10K 1/02* (2006.01)
  *B01D 53/00* (2006.01)

(52) U.S. Cl.
  CPC .......... *B01D 2257/708* (2013.01); *B03C 3/014* (2013.01); *B03C 3/017* (2013.01); *C10B 49/08* (2013.01); *C10B 53/02* (2013.01); *C10K 1/04* (2013.01); *C10K 1/028* (2013.01); *Y02E 50/14* (2013.01)
  USPC ....... 201/30; 95/67; 95/73; 585/240; 585/242

(56) References Cited

U.S. PATENT DOCUMENTS

| | | | |
|---|---|---|---|
| 4,375,402 A | 3/1983 | Duray-Swamy | |
| 4,424,680 A | 1/1984 | Rothchild | |
| 4,696,679 A | 9/1987 | Albulescu et al. | |
| 5,150,576 A | 9/1992 | Minzenberger | |
| 6,567,157 B1 | 5/2003 | Flagan et al. | |
| 8,476,480 B1* | 7/2013 | Brown et al. | 585/242 |
| 2005/0039599 A1 | 2/2005 | Johnson et al. | |
| 2007/0129559 A1 | 6/2007 | Kruidenberg | |
| 2011/0245489 A1* | 10/2011 | Steele et al. | 536/124 |

OTHER PUBLICATIONS

International Written Opinion issued Aug. 22, 2011 for International Application PCT/US2011/037765.

International Preliminary Report on Patentability issued Dec. 28, 2012 for International Application PCT/US2011/037765.

U.S. Appl. No. 61/093,045, filed Aug. 29, 2008.

Mohan et al, Pyrolysis of Wood/Biomass for Bio-oil: A Critical Review, Energy & Fuels 2006, 20, 848-889.

* cited by examiner

SELECTIVE TEMPERATURE QUENCH AND ELECTROSTATIC RECOVERY OF BIO-OIL FRACTIONS

CROSS-REFERENCE TO RELATED APPLICATIONS

This application claims priority to 61/358,351, filed Jun. 24, 2010.

FEDERALLY SPONSORED RESEARCH STATEMENT

Not applicable.

REFERENCE TO MICROFICHE APPENDIX

Not applicable.

FIELD OF THE INVENTION

This invention relates to methods of cooling and separating components of biomass pyrolysis product mixtures. More specifically, this invention relates to the use of rapid quenching and separation by electrostatic precipitation at predetermined temperatures in order to collect one or more specified fraction(s) of the hot mixture.

BACKGROUND OF THE INVENTION

The use of renewable energy sources is becoming increasingly necessary to reduce emissions of carbon based fuels and provide alternatives to petroleum based energy and feedstocks. One of the alternatives being explored is the use of biomass. Biomass is any carbon containing material derived from living (or formerly living) organisms, such as wood, wood waste, crops, crop waste, waste, and animal waste.

Pyrolysis, which is the thermal decomposition of a substance into its elemental components and/or smaller molecules, is used in various methods developed for producing hydrocarbons, including but not limited to hydrocarbon fuels, from biomass. Pyrolysis requires moderate temperatures, generally greater than about 325° C., such that the feed material is sufficiently decomposed to produce products which may be used as hydrocarbon building blocks.

The pyrolysis of biomass generally produces four primary products, namely water, "bio-oil," also known as "pyrolysis oil," char, and various gases ($H_2$, CO, $CO_2$, $CH_4$, and other light hydrocarbons) that do not condense, except under extreme conditions. For exemplary purposes, the pyrolysis decomposition products of wood from white spruce and poplar trees are shown in Table 1.

TABLE 1

| Source: Piskorz, J., et al. In Pyrolysis Oils from Biomass, Soltes, E. J., Milne, T. A., Eds., ACS Symposium Series 376, 1988. | White Spruce | Poplar |
|---|---|---|
| Moisture content, wt % | 7.0 | 3.3 |
| Particle size, μm (max) | 1000 | 590 |
| Temperature | 500 | 497 |
| Apparent residence time | 0.65 | 0.48 |
| Product Yields, wt %, m.f. | | |
| Water | 11.6 | 12.2 |
| Gas | 7.8 | 10.8 |
| Bio-char | 12.2 | 7.7 |
| Bio-oil | 66.5 | 65.7 |

TABLE 1-continued

| Source: Piskorz, J., et al. In Pyrolysis Oils from Biomass, Soltes, E. J., Milne, T. A., Eds., ACS Symposium Series 376, 1988. | White Spruce | Poplar |
|---|---|---|
| Bio-oil composition, wt %, m.f. | | |
| Saccharides | 3.3 | 2.4 |
| Anhydrosugars | 6.5 | 6.8 |
| Aldehydes | 10.1 | 14.0 |
| Furans | 0.35 | — |
| Ketones | 1.24 | 1.4 |
| Alcohols | 2.0 | 1.2 |
| Carboxylic acids | 11.0 | 8.5 |
| Water-Soluble-Total Above | 34.5 | 34.3 |
| Pyrolytic Lignin | 20.6 | 16.2 |
| Unaccounted fraction | 11.4 | 15.2 |

Fast pyrolysis is one method for the conversion of biomass to bio-oil. Fast pyrolysis is the rapid thermal decomposition of organic compounds in the absence of atmospheric or added oxygen to produce liquids, char, and gas. Generally, fast pyrolysis uses <10% dry feedstock of biomass comminuted into small particles (< about 3 mm), moderate temperatures (325-750° C.), and short residence times (0.5-2 seconds). This pyrolysis reaction may be followed by rapid quenching to avoid further decomposition of the pyrolysis products and secondary reactions amongst the pyrolysis products.

Fast pyrolysis affords operation at atmospheric pressure, moderate temperatures, and with low or no water usage. Bio-oil yields typically range from 50-75% mass of input biomass and are heavily feedstock dependent. Generally, known methods of bio-oil production result in bio-oil with high oxygen and water content, and the high oxygen and water content may result in storage instability and phase-separation issues.

For example, the pyrolysis of a wood-based biomass will produce a mixture of organic compounds such as lignin fragments, aldehydes, carboxylic acids, phenols, furfurals, alcohols, and ketones, as well as water. Unfortunately, compounds such as the aldehydes and acids may react with other components of the bio-oil, creating instability, corrosiveness, and poor combustion characteristics.

Other compounds in the bio-oil, such as alcohols, carbonyls, carbohydrates, and phenols have potential in the industry as commodity chemicals, but only if they can be purified in a cost effective manner. Therefore, the ability to selectively remove compounds from bio-oil into defined fractions is important to fully develop biomass as a renewable resource.

Many known biomass fast pyrolysis processes use liquid coolants injected into spray scrubbers to rapidly cool bio-oil vapors into a liquid form, but without attempting to recover individual chemical components. The result is a complex mixture that is acidic and unstable, requiring costly and/or complicated methods to stabilize the bio-oil for storage and subsequent use.

Other known processes use liquid cooled indirect contact heat exchangers to recover bio-oil. One process, disclosed in U.S. Patent Application Ser. No. 61/093,045, uses a combination of condensers with finely controlled wall temperatures and electrostatic precipitators to selectively condense and collect pyrolysis product vapors based upon partial pressures and saturation temperatures. While this method selectively condenses and collects bio-oil vapors into unique fractions, the approach requires a unique condenser for each fraction collected and is thus expensive to implement. In addition, this method is subject to charring and tarring that leads to system clogging and secondary reactions.

Therefore, it would be desirable to have a method of separating the various hot pyrolysis products into useful fractions in a more cost effective manner.

SUMMARY OF THE INVENTION

As used herein, the term "biomass" includes any renewable source (living or formerly living), but does not include oil, natural gas, and/or petroleum. Biomass thus includes wood, paper, crops, animal and plant fats, biological waste, and the like.

"Bio-oil," or "pyrolysis oil" as used herein, is a complex mixture of several hundred organic compounds, such as lignin fragments, aldehydes, carboxylic acids, carbohydrates, phenols, furfurals, alcohols, and ketones, derived from fast pyrolysis of biomass feedstocks.

Generally speaking, the invention relates to collecting useful fractions from hot pyrolysis oil or similar complex hot mixtures by cooling the hot mixture to predefined temperatures by direct contact with a gas or liquid coolant, and then collecting the aerosols formed during cooling and condensation of the hot vapor with an electrostatic precipitator. These fractionation steps can be repeated at progressively cooler steps to collect additional fractions.

It is known in the art how to calculate the desired quench temperature based on pressure, flow rate, latent heat of vaporization of the coolant, latent heat of vaporization of the bio-oil compounds and saturation temperature of the desired compounds, so as to collect the desired fraction from the complex mixture.

Generally speaking, the quench condensation to form aerosols and electrostatic precipitator collections should be at similar temperatures, called here a "predetermined temperature," that is determined based on which components are desired to be collected in a particular fraction. The predetermined temperature need not be calculated for each pyrolysis run, but can be estimated based on prior experience and general knowledge of the expected components.

Further, variations in the feedstock and operating conditions can cause variance in amount of a compound in the bio-oil vapor stream leading to changes in the saturation temperature of the bio-oil compounds. Thus, the wall temperature of the electrostatic precipitator should be controlled to the extent that the next condensing component is not collected in a particular fraction, which is accomplished by heating the electrostatic precipitator wall temperature to a slightly higher (~5° C.) than the saturation temperature of the compound desired to condense in the following fraction. Therefore, the term "about" with respect to "predetermined temperatures" includes such variation as is acceptable with regards to the intended fractions to be collected and in reference to significantly contaminating components of the next fraction.

In one embodiment the invention is a method of quenching a complex mixture of vaporized compounds for collection of formed aerosols, the method comprising injecting a cooling fluid into a complex mixture of vaporized compounds to form a combined cooling fluid/vapor/aerosol stream; separating from the combined cooling fluid/vapor/aerosol stream a first one or more targeted components by electrostatic precipitation at a first predetermined temperature to form a first condensed aerosol stream comprising the first one or more targeted components and a first gas/vapor stream, wherein the first predetermined temperature is less than the vaporization temperature of the first one or more targeted components; and collecting the first condensed aerosol stream.

The "cooling fluid" or "coolant" can be a gas or liquid, or combinations thereof, and preferably is $N_2$, $H_2$, CO, $CO_2$, $CH_4$, $H_2O$, the aqueous phase of bio-oil or other small hydrocarbons, and combinations thereof. In some embodiments, inert gases (such as nitrogen, helium, argon and other noble gases) may be preferred because of their low reactivity with the hot mixture. Most preferably, the cooling fluid is nitrogen or liquid nitrogen or mixtures thereof because of its low cost and low reactivity. In preferred embodiments, the fluid can also be low in oxygen content, to both reduce oxidation and reduce the danger of explosions.

In preferred embodiments, the condensation of vapors to aerosols and collection of aerosols by electrostatic precipitation are repeated at progressively cooler temperatures, and if desired the final hot gas mixture can be further cooled with any condenser to produce a final liquid fraction and a non-condensable fraction that is further cooled and recirculated as the cooling fluid.

Another embodiment of the invention is fractioning a hot pyrolysis oil, by a) injecting a coolant into a hot pyrolysis oil to selectively condense a first fraction of components from said hot pyrolysis oil at a first predetermined temperature; b) collecting said first fraction by electrostatic precipitation at or less than said first predetermined temperature; and c) injecting additional coolant into said hot pyrolysis oil to selectively condense a second fraction of components from said hot pyrolysis oil at a second predetermined temperature; d) collecting said second fraction by electrostatic precipitation at or less than said second predetermined temperature; and e) optionally repeating steps c) and d) at progressively cooler temperatures. The coolant can be as described above, and the method can be combined with other processes.

DESCRIPTION OF EMBODIMENTS OF THE INVENTION

Figure 1:
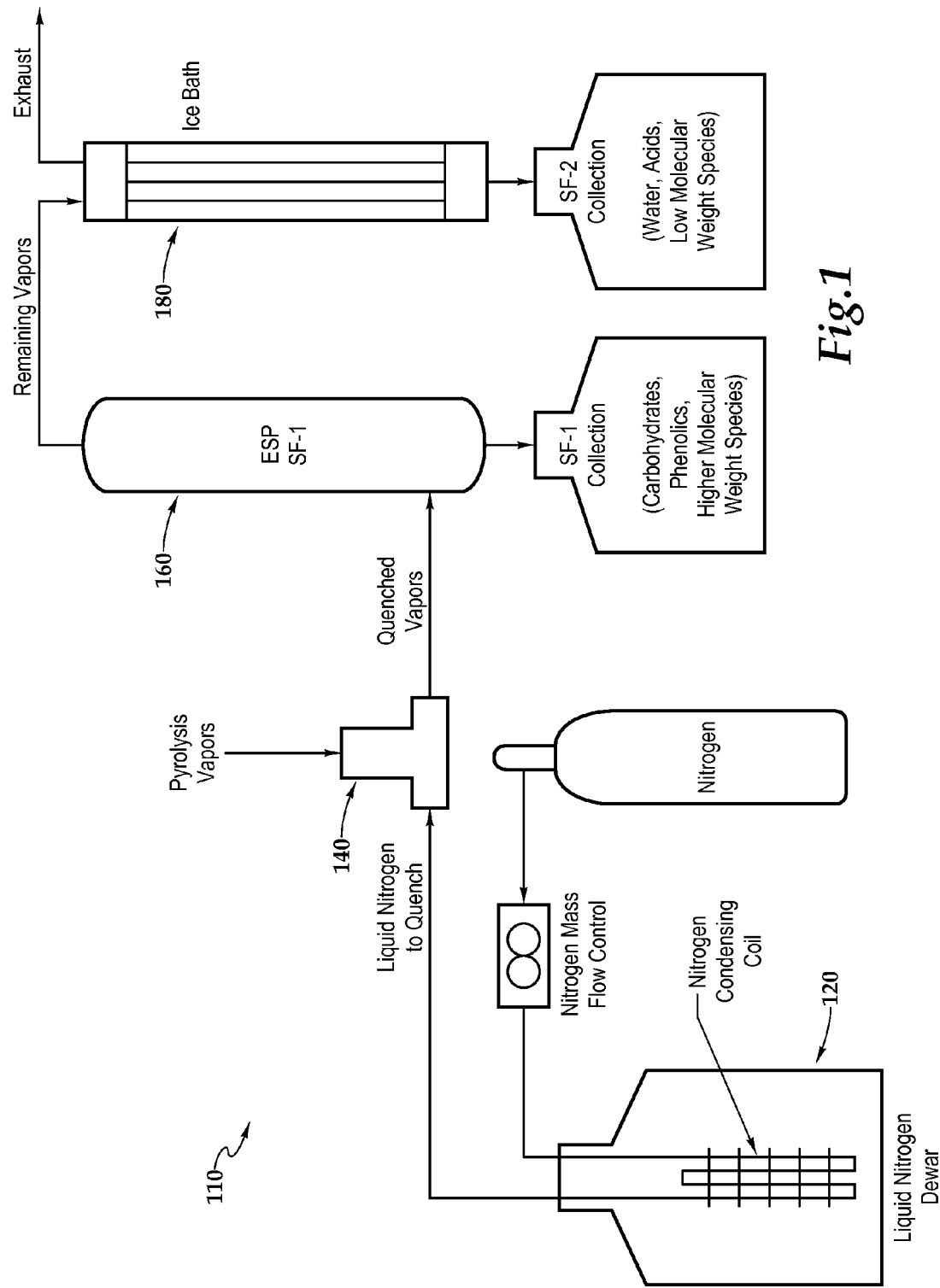
FIG. 1 is a schematic illustrating equipment useful in some embodiments of the inventive process.

Embodiments of the invention provide a novel process for collecting unique bio-oil fractions produced from fast pyrolysis of biomass using cold gas or liquid quench coupled with an electrostatic precipitator. The quench/electrostatic precipitator rapidly chills hot pyrolysis vapors into unique liquid fractions using direct contact with a coolant that is a gas or a liquid and which itself vaporizes during the process of cooling the hot pyrolysis vapors.

The pyrolysis vapors thus precipitate to form small liquid droplets (i.e., aerosols). The aerosol particles are then collected using an electrostatic charge. The composition of the precipitate is manipulated by adjusting the quench temperature, allowing specific components or groups of components in the pyrolysis vapors to be selectively collected, and the selective quench can be performed multiple times in order to sequentially fractionate various components of the mixture.

Other embodiments of the invention further provide methods to separate components into classes of compounds, such as carbohydrates, phenolics, and water and water soluble components (e.g., carboxylic acids and other light oxygenates). Embodiments of the inventive process minimize or eliminate reactions between and/or amongst the various pyrolysis product components, and particularly, acid-catalyzed reactions, are minimized. Some embodiments of the invention provide sufficient separation of pyrolysis product components by class that further purification amongst class components is feasible using traditional distillation processes. Certain embodiments of the inventive process provide narrow bio-oil fractions.

Some embodiments of the inventive process further eliminate substantially all reactions between and/or amongst the various pyrolysis product components, and particularly, acid catalyzed reactions, by rapid cooling, as well as separation of the bio-oil into narrow fractions. Some embodiments of the inventive process further provide bio-oil that is substantially moisture free.

Additionally, the inventive process has the potential to eliminate the use of indirect contact heat exchangers to cool the pyrolysis product vapors, although such devices can be advantageously employed after the quench fractions to collect the final fractions.

Embodiments of the inventive process use any pyrolyzer supplying sufficient heat to pyrolyze biomass feedstock, including without limitation, fluidized bed pyrolyzers, pyrolyzers that employ direct heat transfer with a hot gas, circulating hot solid, such as auger reactors, rotating cones, and circulating fluidized beds.

Embodiments of the inventive process separate the components of the pyrolysis product vapors by cooling the vapors with fluids or gases or mixtures thereof, in a stepwise fashion to predetermined temperatures, forming aerosols that are then collected in an electrostatic precipitator.

The inventive process is exemplified herein using bio-oil, but the process may be applied to other mixtures of components for which it is desired to both cool and fractionate the components based on boiling point ranges.

EXAMPLE 1

A test was performed on a lab scale 100 gram per hour fluidized bed system with the first generation bio-oil collection system. Corn stover feedstock ground to 0.50 mm was loaded into the feed hopper and fed to the fluidized bed with a nitrogen entrainment system that entrains the biomass particles in a stream of nitrogen and blows them into the fluidized bed. The corn stover was entrained in 3 standard liters per minute of nitrogen and the silica sand bed was fluidized with 8 standard liters per minute. The fluidized bed was operated at 500° C. and the pyrolysis vapors were then passed through two cyclones (used to separate out bio-char) which were both heat traced and maintained at 475° C. The wall temperature of the electrostatic precipitator was maintained at 80° C. and the electrostatic precipitator rod was charged to a potential of 15000 volts in relation to the walls.

The mixing zone in which the hot pyrolysis vapors and quench fluid (liquid nitrogen in this case) are mixed was constructed of a pipe fitting that divides into two streams at 45° to the original stream, commonly known as a wye pipe (shaped like the letter "Y"). The hot pyrolysis vapors entered vertically into the mixing zone where they mixed with a horizontal stream of cold nitrogen gas, cooled by gaseous nitrogen flowing through a condenser coil in a tank of liquid nitrogen at 10 standard liters per minute. The combined stream exited the wye pipe at −45° to the horizontal.

The wye pipe geometry is important in the mixing zone to prevent either of the incoming streams from impinging normal to a pipe wall causing coking on the wall from the hot vapors or freezing on the wall from the cold quench fluid, but other methods can be used to achieve this effect.

The mixed stream then entered the electrostatic precipitator at an average temperature near 85° C. The remaining vapors then passed into a collection coil submerged in an ice bath where the aqueous phase of the bio-oil collected near 0° C. The corn stover feedstock produced approximately 46% bio-oil split into 42.5% of the bio-oil collected in the first stage fraction and 57.5% of the bio-oil in the second stage fraction.

FIG. 1 is a schematic illustrating an equipment setup for use with the inventive process. As illustrated in FIG. 1, the process utilizes a collection system 110 including a chiller 120, a mixing zone 140, an electrostatic precipitator 160, and a cooler 180. Chiller 120, which may be any suitable equipment including for example, a liquid nitrogen bath, is used to cool the cooling fluid which will be injected into the hot pyrolysis product vapor stream. The chilled cooling fluid and hot pyrolysis product vapor stream are mixed together in the mixing zone 140. The temperature and flow rate of the injected cooling fluid is set to drop the resulting mixture to a predetermined temperature, depending on which components of the mixture are to be collected. The mixing zone, subsequent lines, and electrostatic precipitator 160 were heated to prevent further cooling of the cooling fluid/pyrolysis product mixture and thus control the fractionation temperature within a few degrees of accuracy. This mixture then enters the heated electrostatic precipitator 160 wherein it is separated by inducing an electrostatic potential causing the aerosol particles to deposit on the inner surface of the electrostatic precipitator 160. The precipitated aerosol particles were permitted to flow downward and exit the precipitator 160. The process can then be repeated at progressively cooler temperatures.

The system illustrated in FIG. 1 was used to cool and separate the pyrolysis vapor stream arising from fast pyrolysis of a corn stover feedstock. The corn stover used comprised leaves, husk, cob and stalks of maize (*Zea mays* ssp. *mays* L.) plants left in a field after harvest.

Figure 2:
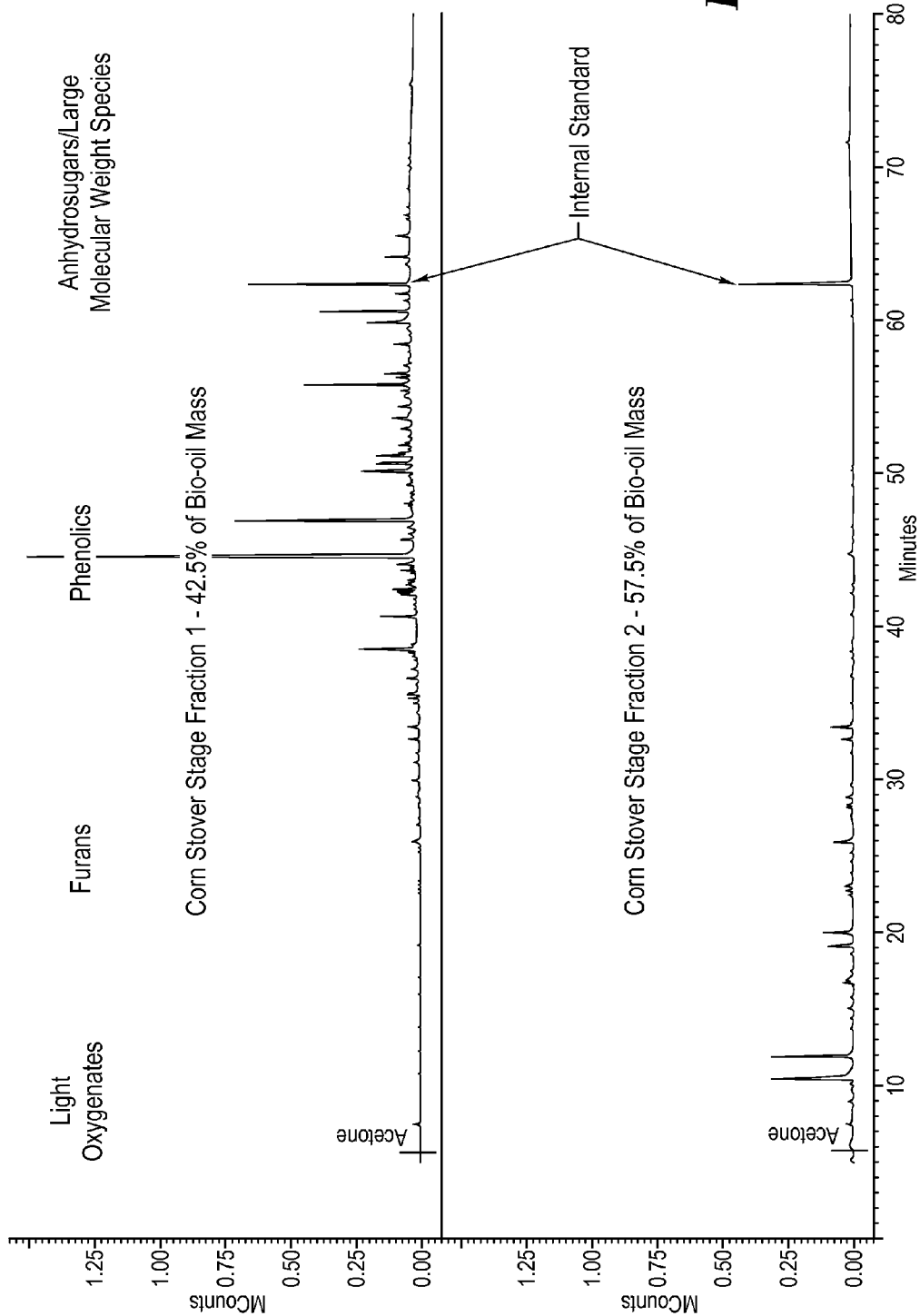
FIG. 2 illustrates the GC/MS spectra of the separated products of pyrolysis of corn stover utilizing the equipment of FIG. 1.

FIG. 2 is a gas chromatograph/mass spectrometer (GC/MS) spectra of the separated components of the fast pyrolysis product of corn stover. The internal standard was phenathrene, which is not found in bio-oil. The shaded box in FIG. 2 represents the desired cut-off point, where compounds are found in both separated fractions 1 and 2. FIG. 2 shows that the inventive process utilized in Example 1 collected the high molecular weight components in fraction 1 (e.g., phenolics, anhydrosugars, and other larger molecular weight species in the upper trace) and the lower weight components in fraction 2 (e.g., water, acetic acid, furans, other light oxygenates in the lower trace).

EXAMPLE 2

Figure 3:
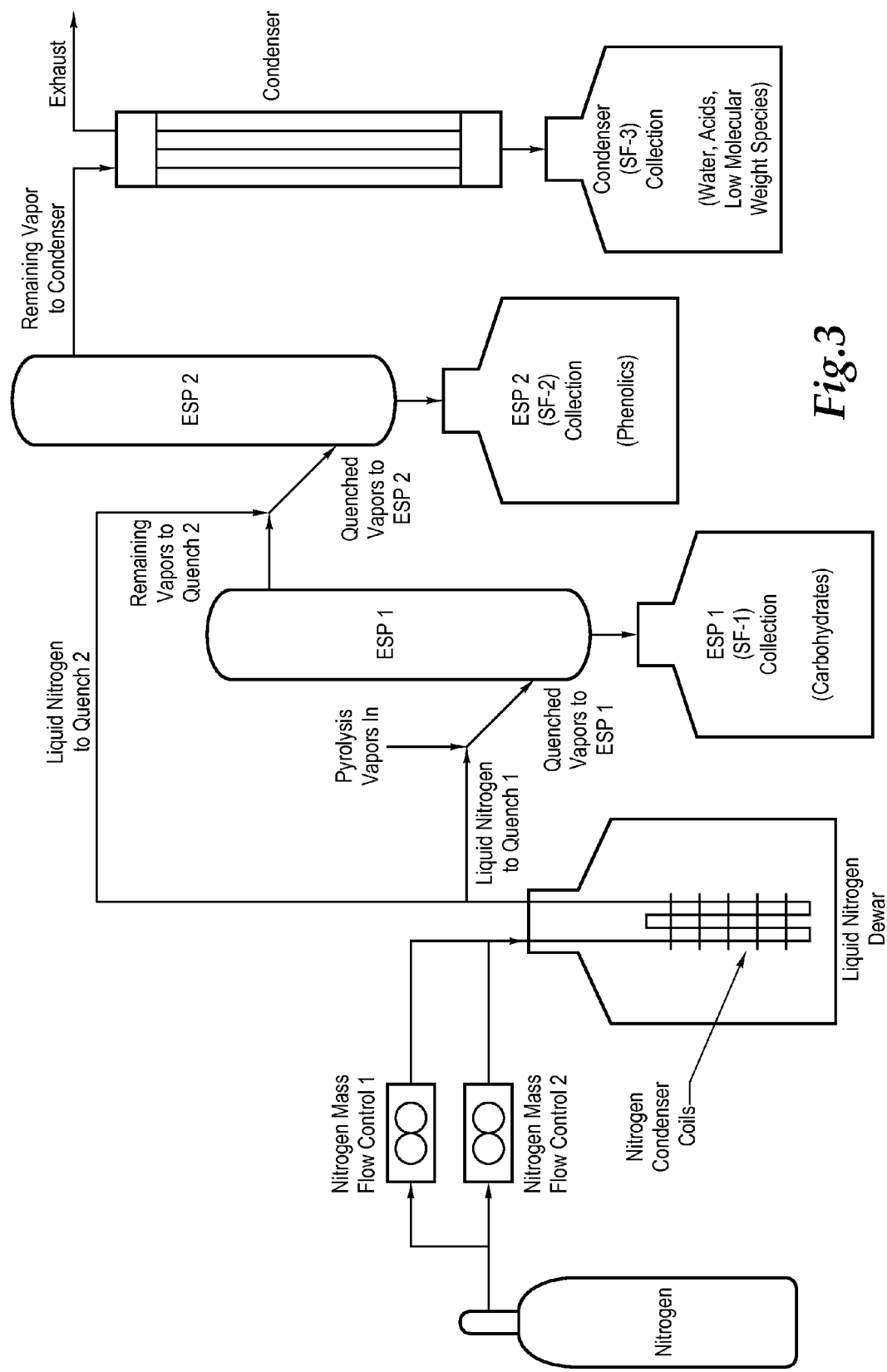
FIG. 3 is a schematic illustrating alternative equipment useful in some embodiments of the inventive process.

FIG. 3 illustrates an alternative equipment setup for use in some embodiments of the inventive process. This alternative equipment configuration was used in separating out a carbohydrate/lignin oligomer fraction in a first stage recovery, a phenolic fraction in a second stage recovery and a water, acids, aldehydes, ketones, and other low molecular weight species fraction in a third stage recovery.

A test was performed on a lab scale 100 gram per hour fluidized bed system with the second generation bio-oil collection system. Red oak feedstock ground to 0.50 mm was loaded into the feed hopper and fed to the fluidized bed with a nitrogen entrainment system that entrains the biomass particles in a stream of nitrogen and blows them into the fluidized bed. The feedstock was entrained in 3 standard liters per minute of nitrogen and the silica sand bed was fluidized with 8 standard liters per minute. The fluidized bed was operated at 500° C. and the pyrolysis vapors were then passed through two cyclones (used to separate out bio-char) which were both heat traced and maintained at 475° C.

The bio-oil collection system split the bio-oil into three fractions using two quench-electrostatic precipitator systems and one shell and tube heat exchanger to collect the aqueous phase. The first stage fraction was targeted to collect mostly anhydrosugars and large molecular weight species leading the quench to operate at 210° C. with an electrostatic precipitator wall temperature of 150° C. to prevent the condensed components from coking on the walls. Stage fraction 1 collected 24.9% of the total bio-oil mass. The second stage fraction was targeted to collect phenolic compounds leading the second quench to operate at 85° C. with electrostatic precipitator wall temperatures of 80° C. Stage fraction 2 collected 14.6% of the bio-oil mass. The third stage fraction was collected in a shell and tube heat exchanger with a wall temperature of −18° C. Stage fraction 3 collected 60.5% of the bio-oil mass. This first attempt at a second generation system successfully demonstrated the process of applying the quench-electrostatic precipitator system for multistep fractionation.

EXAMPLE 3

Figure 4:
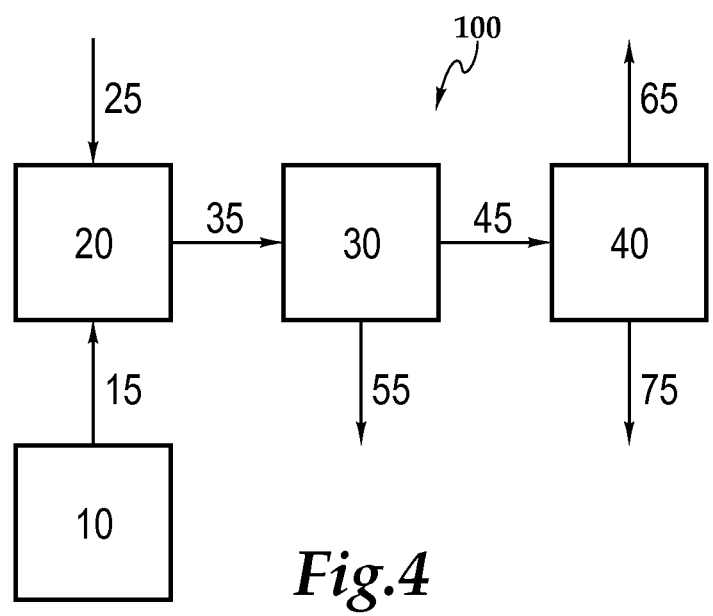
FIG. 4 is a schematic illustrating an alternative embodiment of the quench system useful in the inventive process.

FIG. 4 illustrates another embodiment of the inventive process. A collection system 100 includes a chiller 10, a mixing zone 20, an electrostatic precipitator 30 and a condenser 40. In some embodiments, the chiller 10 cools a stream of cooling fluid 15 which is injected into the mixing zone 20. In one embodiment, the cooling fluid 15 is nitrogen. In other embodiments, the cooling fluid 15 may be any gas or liquid that will vaporize when exposed to the pyrolysis vapor product.

In a specific embodiment, the cooling fluid 15 is at a temperature of about −195° C. In other embodiments, the temperature of the cooling fluid 15 can be any temperature cooler than the precipitation temperature of the pyrolysis vapor product component which is desired to be separated and collected. Also injected into the mixing zone 20 is a stream of hot pyrolysis vapor product 25.

In a preferred embodiment, the hot pyrolysis vapor product 25 consists of the vapor from the pyrolysis reactor. In another preferred embodiment, the hot pyrolysis vapor product 25 is at a temperature near the exit temperature of the of the pyrolysis reactor. In other embodiments, the temperature of the hot pyrolysis vapor product 25 could be any temperature warmer than the precipitation temperature of the pyrolysis vapor product component that is desired to be separated and collected from the pyrolysis vapor product.

The cooling fluid 15 and hot pyrolysis vapor product 25 are mixed together in the mixing zone 20, preferably using a wye pipe to prevent any surface from being subject to an extreme temperature gradient that may result from hot vapors or cold cooling fluid being forced in the mixing zone at a normal direction to pipe surface.

In some embodiments, the temperature and flow rate of the cooling fluid 15 is calculated to result in a combined cooling fluid/pyrolysis vapor stream 35 which has a temperature less than the saturation temperature of pyrolysis vapor product component that is desired to be separated and collected from the pyrolysis vapor product 25. In other embodiments, the composition of the combined cooling fluid/pyrolysis vapor stream 35 can be manipulated by adjusting the temperature or partial pressure of the mixing zone 20, allowing selective separation and collection of pyrolysis vapor product components or group of components that are desired to be separated and collected from the pyrolysis vapor product 25.

In the preferred embodiment, the mixing zone 20 is at or near atmospheric pressure. In some embodiments, the geometry of the mixing zone 20 may be changed to raise or lower the pressure and subsequent partial pressures of the bio-oil compounds which would alter the saturation temperature of the targeted compound thus raising or lowering the temperature at which the mixing zone would be operated. This could become useful with compounds with relatively high saturation temperatures (~>150° C.) where decomposition of the condensed aerosols on the heated electrostatic precipitator wall could become a problem. In these cases, the pressure may be reduced to reduce the partial pressure of the targeted compounds to prevent decomposition on hot electrostatic precipitator walls.

The combined cooling fluid/pyrolysis vapor stream 35 then pass to the electrostatic precipitator 30. In a preferred embodiment, the temperature of the combined cooling fluid/pyrolysis vapor stream 35 is slightly greater than the saturation temperature of water for the particular cooling fluid/pyrolysis vapor stream 35 composition. In other embodiments, dependent upon the composition of the hot pyrolysis vapor product 25, the temperature of the combined cooling fluid/pyrolysis vapor stream 35 can be adjusted by changing the temperature and/or flow rate of the cooling fluid 15. In such instances, the temperature of the mixing zone 20 may then be adjusted to slightly less than the saturation temperature for the components or group of components targeted for removal in the electrostatic precipitator 30.

In some embodiments, the external temperature of the mixing zone 20, the electrostatic precipitator 30, and the lines to the electrostatic precipitator 30 are maintained at a temperature which will prevent further cooling of the hot pyrolysis vapor product 25 and the combined cooling fluid/pyrolysis vapor stream 35. In a preferred embodiment, the mixing zone 20, the electrostatic precipitator 30 and the lines to the electrostatic precipitator 30 are temperature controlled using electrical heaters. In a preferred embodiment, the mixing zone 20, the electrostatic precipitator 30 and the lines to the electrostatic precipitator 30 are maintained at a temperature at or just above the mixing zone temperature to prevent undesired condensation.

The combined cooling fluid/pyrolysis vapor stream 35 enters the electrostatic precipitator 30 separating into a stream of gas/vapors 45 and a condensed phase of aerosol particles 55. The operating pressure of the electrostatic precipitator 30 may be adjusted to raise or lower the overall pressure in the system and subsequent partial pressures of the targeted component(s) to increase or decrease the wall temperature of the electrostatic precipitator based on saturation temperatures of the targeted component(s). The operating temperature of the electrostatic precipitator 30 is preferably maintained at a temperature slightly greater than the saturation temperature of component(s) to be collected in the subsequent fraction. For example, if the saturation temperature of water in the stream is 80° C. and water is targeted to be collected in the second fraction, the wall temperature of the first electrostatic precipitator fraction may be at approximately 85° C. to prevent water from condensing on the electrostatic precipitator wall and mixing with the first fraction.

The aerosols 55 exit the electrostatic precipitator 30 as a liquid through a collection point (preferably collected by gravity at a lower collection point) and the gas/vapors 45 are sent for further cooling in subsequent quench-electrostatic precipitator systems with different component(s) targeted for separation and collection in each such subsequent quench-electrostatic precipitator system.

In a preferred embodiment, the gas/vapors 45 can be further cooled in a condenser 40. Condenser 40 may separate out an exhaust 65 comprised of gases formed in the pyrolysis reaction (e.g., carbon dioxide, carbon monoxide, ethane, methane, and/or propane) and a product stream 75 containing water, acids, and other light oxygenates. In a preferred embodiment, the temperature of the wall in condenser 40 is set to condense the entire amount of gas/vapors 45 to the product stream 75. The operating temperature of condenser 40 may be set slightly greater than the freezing temperature of the product stream 75 (and/or the greatest freezing temperature of the components of the product stream 75) to ensure maximum collection efficiency of the condenser. The operating pressure of condenser 40 may be adjusted to raise or lower, as desired, the partial pressures of the remaining components of stream 75 to selectively condense any remaining targeted components. For example, operating condenser 40 near atmospheric pressure and around −15° C. would condense out water, acids, and other light oxygenates. However operating near 3 atmospheres and −15° C. would also condense propane from the product stream 75. In addition, one or more subsequent condensers may be added downstream of condenser 40 to selectively condense and recover components such as propane, carbon dioxide, and other gases.

Figure 5:
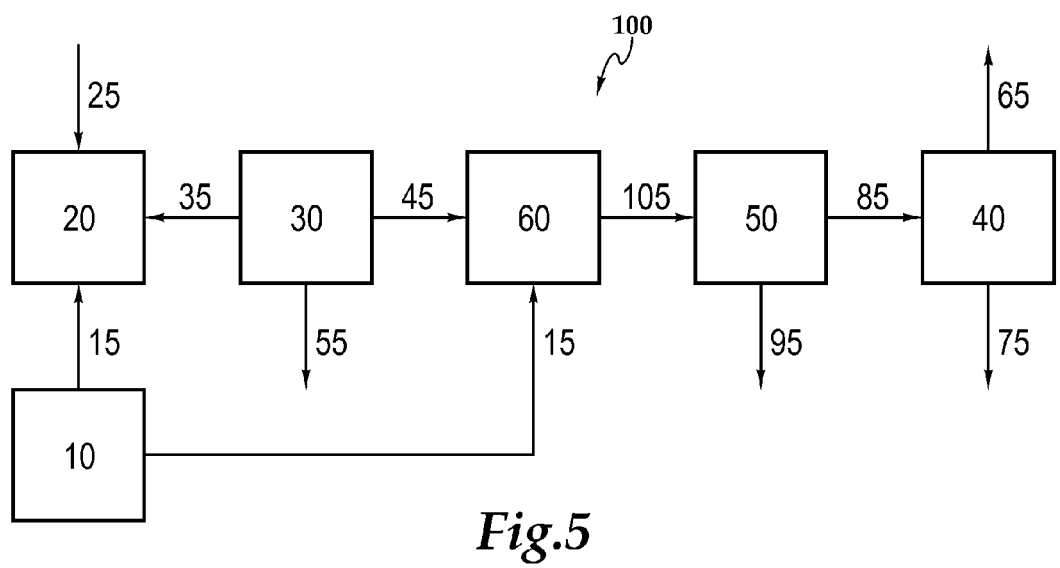
FIG. 5 is a schematic illustrating another alternative embodiment of the quench system useful in the inventive process.

In an alternate embodiment, shown in FIG. 5, the gas/vapors 45 may be directed through an additional mixing zone 60 where the remaining vapors progressively cooled and subjected to an additional electrostatic precipitator 50 to remove a second condensed phase of aerosols 95 with a different composition than the first condensed phase of aerosols 55. Additional electrostatic precipitators may be added in series to allow a more precise, selective separation of the product stream 75 by stepping down the quench-electrostatic precipitator temperatures to the saturation temperatures of targeted components.

The gas/vapors 45 enter the second mixing zone 60 where they are cooled with a cooling fluid 15 and form a second aerosols stream 105. The second aerosols stream 105 passes into a second electrostatic precipitator 50 separating into a stream of gas/vapors 85 and second condensed phase of aerosols 95. The operating pressure of the second electrostatic precipitator 50 may be slightly lower than the operating pressure of the first electrostatic precipitator 30 but again may be altered to change the saturation temperature of targeted component(s). The second condensed phase of aerosols 95 exits the second electrostatic precipitator 50 as a liquid (preferably through a lower collection point fed by gravity flow of the condensate) and the gas/vapors 85 may be further cooled in either a subsequent electrostatic precipitator or a final condenser 40.

In some embodiments, the collection system 100 may be optimized for heat exchange between the chiller 10, the mixing zone 20, the electrostatic precipitator 30 and the condenser 40. For instance, heat rejected from the chiller could be used to heat the electrostatic precipitator walls.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

What is claimed is:

1. A method of fractioning hot pyrolysis vapor from biomass pyrolysis, said method comprising the following sequential steps:
   a) injecting a coolant comprising at least one of nitrogen, a noble gas and mixtures thereof into a hot pyrolysis vapor to selectively condense a first fraction of components from said hot pyrolysis vapor at a first predetermined temperature;
   b) collecting said first fraction by electrostatic precipitation in a first electrostatic precipitator at about said first predetermined temperature, wherein a wall temperature of said first electrostatic precipitator is maintained slightly higher than said first predetermined temperature;
   c) injecting additional coolant into said hot pyrolysis vapor to selectively condense a second fraction of components from said hot pyrolysis vapor at a second predetermined temperature;
   d) collecting said second fraction by electrostatic precipitation in a second electrostatic precipitator at about said second predetermined temperature, wherein a wall temperature of said second electrostatic precipitator is maintained slightly higher than the second predetermined temperature; and
   e) optionally repeating steps c) and d) at progressively cooler temperatures.

2. The method of claim 1, wherein the coolant is a liquid.

3. The method of claim 1, where the coolant is a gas.

4. The method of claim 1 wherein said first and second predetermined temperatures are each maintained within a 5° C. range.

5. The method of claim 1 wherein said first and second predetermined temperatures are each maintained within a 3° C. range.

6. The method of claim 1 wherein said first and second predetermined temperatures are each maintained within about a 1° C. range.

7. The method of claim 1 wherein the wall temperature of said first electrostatic precipitator is maintained at about 5° C. higher than said first predetermined temperature.

8. The method of claim 1 wherein the wall temperature of said second electrostatic precipitator is maintained at about 5° C. higher than said second predetermined temperature.

9. The method of claim 1 wherein the wall temperature of said first electrostatic precipitator is maintained at about 5° C. higher than said first predetermined temperature and wherein the wall temperature of said second electrostatic precipitator is maintained at about 5° C. higher than said second predetermined temperature.

10. The method of claim 1, further comprising f) condensing a final hot pyrolysis vapor with a condenser to produce a final liquid fraction and a non-condensable fraction that is further cooled and recirculated as the coolant in step a).

11. The method of claim 10 wherein said first and second predetermined temperatures are each maintained within a 5° C. range.

12. The method of claim 10 wherein said first and second predetermined temperatures are each maintained within a 3° C. range.

13. The method of claim 10 wherein said first and second predetermined temperatures are each maintained within about a 1° C. range.

14. The method of claim 10 wherein the wall temperature of said first electrostatic precipitator is maintained at about 5° C. higher than said first predetermined temperature.

15. The method of claim 10 wherein the wall temperature of said second electrostatic precipitator is maintained at about 5° C. higher than said second predetermined temperature.

* * * * *